Sept. 22, 1970 R. GUIM 3,530,261

STERILIZING DEVICE FOR TELEPHONE HANDSETS

Filed March 22, 1966

INVENTOR.

RAUL GUIM

BY John B. Dickman III

AGENT.

United States Patent Office
3,530,261
Patented Sept. 22, 1970

3,530,261

STERILIZING DEVICE FOR TELEPHONE HANDSETS

Raul Guim, 2161 SW. 14th Terrace, Apt. 2, Miami, Fla. 33144

Filed Mar. 22, 1966, Ser. No. 536,342
Int. Cl. H04r *1/12*
U.S. Cl. 179—185 3 Claims

ABSTRACT OF THE DISCLOSURE

A portable sterilizing device for telephone mouthpieces and receivers, comprising an adhesive backed container with disinfectant means therein, a cover for said container, said cover having a shaped pad attached thereto adapted to pick up disinfectant from said disinfectant means when said cover is on said container, and adapted to contact and sterilize a telephone mouthpiece or receiver when the cover is removed and the pad placed against the mouthpiece or receiver and rotated by the hand. A novel latching arrangement comprises detents in the cover, engageable with an annular groove in the container.

This invention relates to an improved means for sterilizing the mouthpiece and receiver of a telephone handset.

An object of the invention is to provide a portable sterilizing device for attachment to the usual telephone stand or box, whereby the same may be manually removed and applied to the mouthpiece and receiver of the handset for sterilizing and disinfecting the same.

Another object of the invention is to provide a container for attachment to a telephone stand or box for receiving a cake or supply of sterilizing and disinfecting material, and a removable cover with a plastic sponge applicator for wiping the mouthpiece and receiver of the handset thereby sterilizing the same.

A further object of the invention is to provide a plastic box and cover therefor which will respectively hold a cake of disinfecting material and an applicator for wiping and sterilizing the mouthpiece and receiver of a telephone handset, the same having an adhesive surface whereby the box may be readily attached to a telephone stand or box ready for frequent use.

A still further object of the invention is to provide an efficient and inexpensive device for sterilizing the mouthpiece and receiver of a telephone handset, thereby lessening the danger of spreading communicable diseases from one telephone user to others.

Other objects will appear as the description proceeds.

In the accompanying drawings which form a part of this application:

Like characters of reference are used throughout the following specification and the accompanying drawings to designate corresponding parts.

Figure 2:
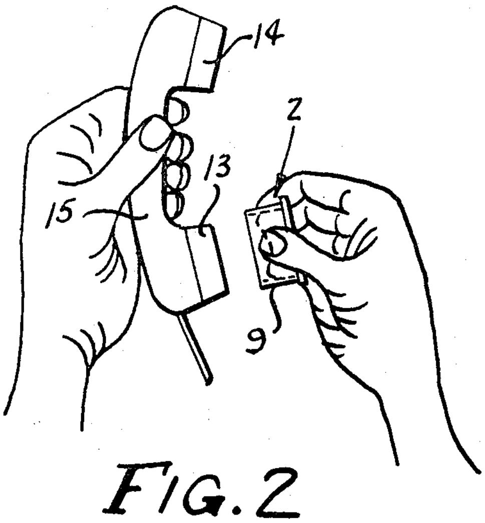
FIG. 2 is a side view of a hand-held telephone handset with a second hand holding my improved sterilizing device.
Figure 1:
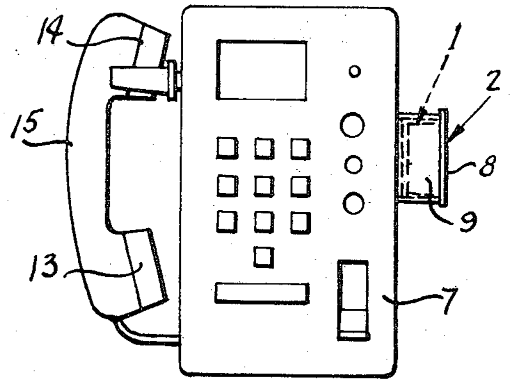
FIG. 1 is a front elevation of a push button telephone with attached handset.

In carrying out my invention, I provide a sterilizing device for the mouthpiece and receiver of a telephone handset, comprising a box or container and a removable cover applicator therefor generally denoted by the reference numerals 1 and 2, respectively. The box or container 1 will have a bottom 3 and peripheral upstanding side wall 4 whose inner wall is tapered outwardly from the bottom 3 to the outer or free edge of said side wall 4. A cake of disinfecting material 5 will be secured in the box or container 1 in contact with the bottom 3. An adhesive coating 6 will be applied to the outer surface of the bottom 3 of the box or container 1, whereby the same may be attached to and supported by the side wall of a telephone stand or box 7.

The applicator cover 2 will have an end closure 8 and an inset peripheral upstanding side wall 9 tapering slightly inwardly therefrom for reception within the side wall of the box or container 1.

A plastic applicator sponge 10 will be attached within and supported by the applicator cover 2 for contacting the cake of disinfecting material 5 when the cover 2 is received within the box or container 1.

Figures 3, 4, 5, 6:
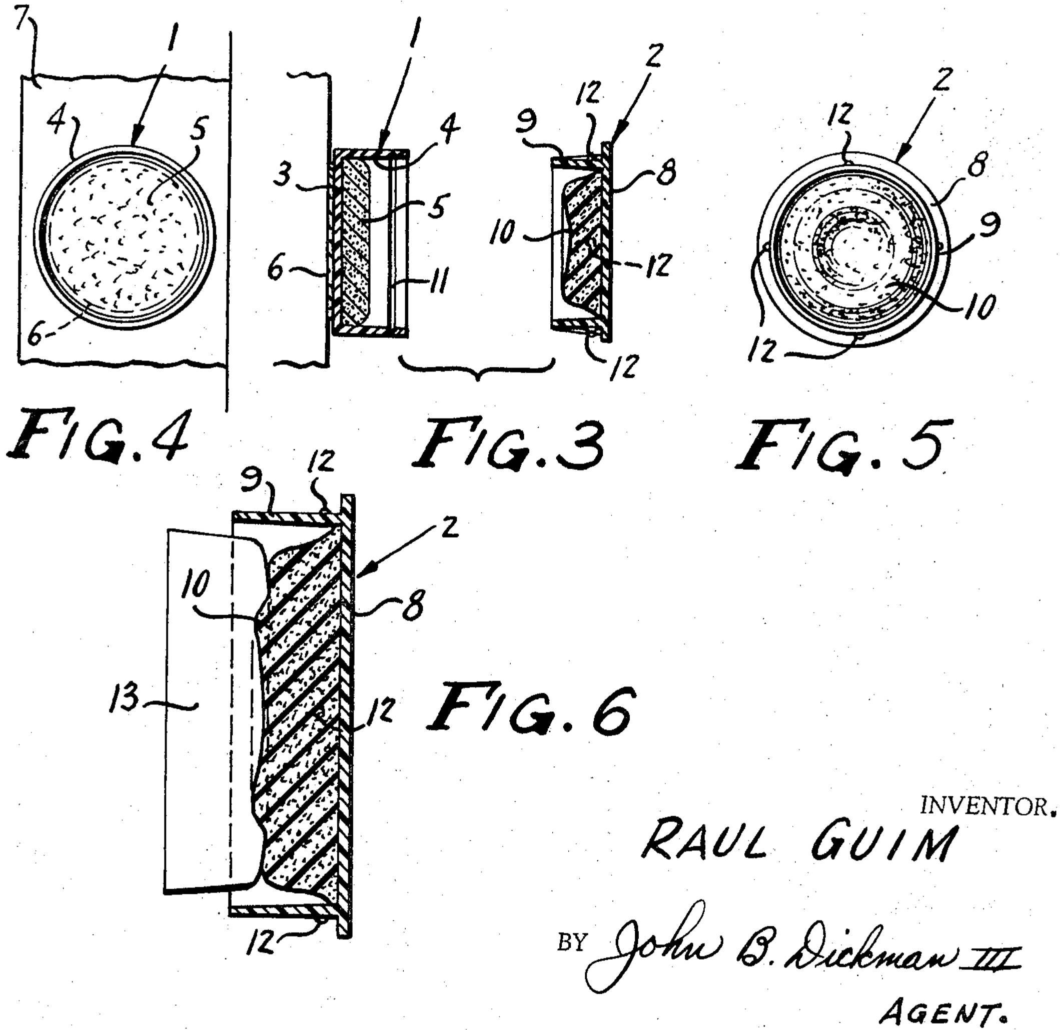
FIG. 3 is an exploded view of the disinfectant containing box adhesively attached to a telephone stand or box and the removable cover with applicator removed therefrom.
FIG. 4 is a front elevation of the sterilizing device attached to the side of a telephone stand or box.
FIG. 5 is a front view looking into the applicator containing cover.
FIG. 6 is a sectional view through the applicator containing cover showing the same in wiping engagement with the mouthpiece or receiver of a telephone handset.

An annular groove 11 is provided in the inner surface of the side wall 4 of the box or container 1 and cooperates with a plurality of locking detents or projections 12 on the outer surface of the annular side wall 9 of the applicator cover 2 for holding the same on the box or container 1. The applicator sponge 10 may be shaped to conform to the surface of the mouthpiece 13 and receiver 14 of the telephone handset 15, thus assuring a positive cleansing and sterilizing of these parts when engaged and wiped by the applicator sponge 10 when rotated thereon. The sponge is the same height as the top portion of the upstanding, tapering side walls of the cover, and will remain within said tapering walls to contact the telephone mouthpiece or receiver as shown in FIG. 6.

From the foregoing description, it will be apparent that I have devised a highly efficient yet inexpensive sterilizing device for the mouthpiece and receiver of a telephone handset.

Having thus described my invention, what I claim as new and desire to secure by Letters Patent of the United States is:

1. A sterilizing device for telephone handsets, comprising a walled box or container open at one end and closed at the opposite end, said open end having tapering walls, disinfecting means in the closed end of said box or container, a removable cover therefor having tapering walls adapted to mate with the tapering walls of the open end of said container, an applicator sponge recessed in said cover and engageable with said disinfecting means when closed over said box or container, and when separated therefrom adapted for wiping engagement with the mouthpiece and receiver of said telephone handset for sterilizing the same when held against the mouthpiece or receiver and rotated by the hand, and cooperating means comprising an annular groove on said box or container and locking detents on said cover for securing the same in closed and assembled relation.

2. The subject matter as claimed in claim 1, and adhesive means on said box or container for attaching the same to a telephone stand, box or wall.

3. The subject matter as claimed in claim 2, said applicator sponge being recessed in said cover and shaped to the contour of said mouthpiece and receiver of the handset.

References Cited

UNITED STATES PATENTS 1,564,748 12/1925 Barrett ____________ 179—185

FOREIGN PATENTS 491,938 1/1930 Germany.

KATHLEEN H. CLAFFY, Primary Examiner

T. W. BROWN, Assistant Examiner